Nov. 18, 1924.

W. R. ALLEN ET AL 1,516,132

OIL AND WATER STRATIFYING DEVICE

Filed Feb. 26, 1923

INVENTORS
WILLIAM M. MARKER
WILLIAM R. ALLEN
FRED RICHMOND

BY *Westall and Wallace*

ATTORNEYS.

Patented Nov. 18, 1924.

1,516,132

UNITED STATES PATENT OFFICE.

WILLIAM R. ALLEN, OF VENTURA, WILLIAM M. MARKER, OF TAFT, AND FRED RICHMOND, OF OILFIELDS, CALIFORNIA.

OIL AND WATER STRATIFYING DEVICE.

Application filed February 26, 1923. Serial No. 621,385.

*To all whom it may concern:*

Be it known that we, WILLIAM R. ALLEN, of Ventura, in the county of Ventura, State of California, WILLIAM M. MARKER, of Taft, in the county of Kern, State of California, and FRED RICHMOND, of Oilfields, in the county of Fresno, State of California, citizens of the United States, have invented new and useful Improvements in Oil and Water Stratifying Devices, of which the following is a specification.

This invention relates to emulsion preventers for oil wells. Crude petroleum as it flows from wells often contains water which is mixed with the oil. When the oil and water are produced under pressure by an oil well, it is usual to discharge the mixture under pressure through a device having a small orifice, such as a flow nozzle. Such treatment produces emulsions which are quite stable and difficult to separate. If the mixture is allowed to flow from the well at a low velocity into a separating chamber, stratification of the oil and water takes place and no emulsion is formed. The present invention relates to a device having a separating chamber into which the oil and water is allowed to flow at a low velocity and wherein it stratifies. The oil and water are then separately withdrawn. It is advantageous to maintain constant the level of the water being the line of demarcation between the water and oil.

The primary object of this invention is to provide apparatus of the character above described which will automatically maintain an approximately constant level of water in the separating chamber.

These objects together with other objects and corresponding accomplishments are obtained by means of the embodiment of our invention illustrated in the accompanying drawing, which is entirely diagrammatic.

Figure 1:
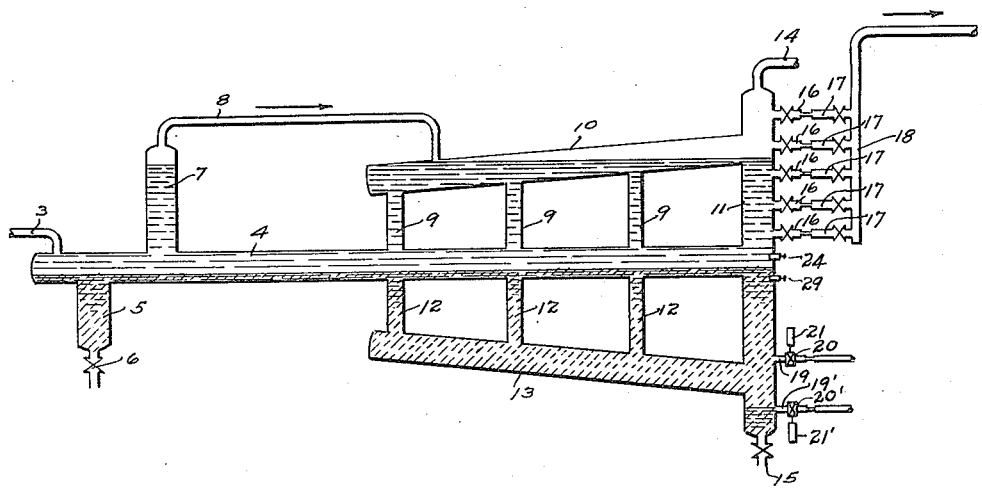
Figure 2:
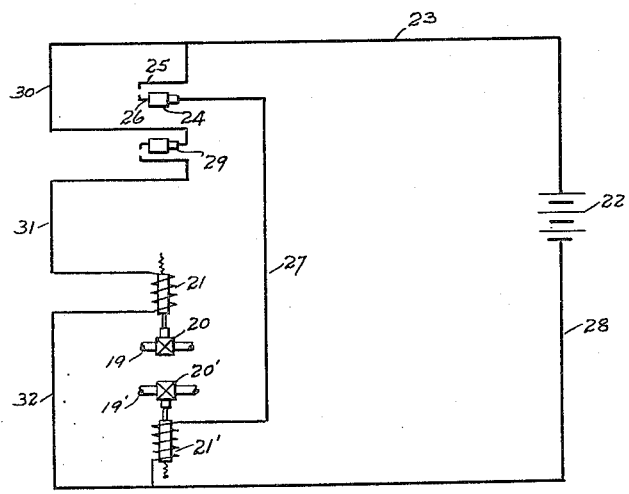

Fig. 1 is a cross-section showing a complete apparatus except the electric wiring; Fig. 2 is a wiring diagram.

Referring more particularly to the drawing, 3 is a pipe which may be connected directly to the casing head of an oil well and which delivers oil, gas, and water under pressure to a horizontal pipe 4 forming a separating chamber. The pipe may be of any suitable length and diameter, depending upon the average rate of flow of the well and other factors. Opening into the bottom of pipe 4 near the inlet end is a sand trap 5 provided with a valved outlet 6. The trap performs its usual function of collecting any sand or other solid matter which may enter the pipe 4.

A gas dome 7 is connected to the top of the pipe 4 beyond the sand trap. Any free gas which is carried by the oil into the pipe will be collected in the gas dome. A pipe 8 connects the gas dome with the oil header, later described. The oil and water stratify in the pipe 4, the water being the heavier falling to the bottom of the pipe and the oil rising to the top.

The oil is conducted by means of risers 9 which communicate with the top of the pipe 4 to an oil header 10. The oil header is preferably inclined from the inlet side upwardly toward the outlet where it communicates with a stand-pipe 11.

Water is conducted from the bottom of the pipe 4 by means of water risers 12 to a water header 13. The water header is preferably inclined downwardly toward the outlet to prevent the accumulation of sand and connects to the lower portion of the stand-pipe 11.

The gas accumulating in the top of stand-pipe 11 and header 10 is conducted to a suitable point by means of a pipe 14 connected to the top of the gas pipe. The bottom of the stand-pipe is provided with a valved outlet 15.

Connected to the upper portion of the stand-pipe above its point of junction with the pipe 4 are a series of gas and oil outlet pipes 16. These pipes are valved and connected to flow nipples 17. The flow nipples comprise constricted openings and communicate with an outlet pipe 18.

Connected to the lower portion of the stand-pipe are water outlet pipes 19 and 19'. Flow of water through these pipes is controlled by means of valves 20 and 20', which are operated by means of springs and solenoids 21 and 21'. An electrical circuit is so arranged that as the level of the water in the stand-pipe reaches a certain point, a corresponding valve will be opened so as to permit the discharge of water.

Referring more especially to Fig. 2 a source of electrical energy, such as a battery is indicated by 22. One terminal of the battery is connected by a conductor 23 to a terminal of a plug indicated generally by 24. The plug has a contact 25 spaced from a contact 26. The contact 25 is connected to the conductor 27, leading to one terminal of the solenoid 21′. The other terminal of the solenoid 21′ is connected by a conductor 28 to the other terminal of the battery 22. The plug 24 may be in the nature of a spark plug as used upon internal combustion engines. The spark plug has a contact 25 spaced from a contact 26. A second plug 29 is installed in the stand-pipe below plug 24. One contact of plug 29 is connected by a conductor 30 to conductor 23, and the other contact is connected by a conductor 31 to one terminal of the solenoid 21. The other terminal of the solenoid 21 is connected by a conductor 32 to conductor 28.

Oil is an electrical insulator. When oil covers a plug, there will be no electrical circuit between its contacts, and no current will pass through the corresponding solenoid. Water is a conductor of electricity, and when water covers the plug, current will pass through the battery and through the corresponding solenoid, thereby energizing the latter. Energization of the solenoid causes the valve to be opened. When water reaches the level of plug 29 the circuit is made and solenoid 21 energized. This causes the valve 20 to be opened and water is discharged from the stand-pipe, thereby lowering the level of the water. As soon as the oil covers the plug, the circuit is broken and a spring or other suitable means returns the valve to closed position. If the water rises faster than the valve 20 can discharge it, plug 24 will eventually be reached by the water and the circuit is made thereby energizing solenoid 21′ and opening valve 20′. This increases the rate of discharge of the water. When the level of the water lowers sufficiently so that oil covers the plug 24, the circuit is opened and valve 20′ is closed. Thus the level of the water is maintained substantially constant.

What we claim is:

In a device for separating fluids of different specific gravities the combination of a receptacle for the fluids being separated composed of pipe sections, a plurality of electrically controlled fluid outlets adapted to be operated so as to maintain a substantially constant level of one of said fluids by difference in electrical conductivity of the different elements of the fluid mixture being separated.

In witness that we claim the foregoing we have hereunto subscribed our names.

WILLIAM R. ALLEN.
FRED RICHMOND.
WILLIAM M. MARKER.